US005237752A

United States Patent [19]

Maseck

[11] Patent Number: 5,237,752

[45] Date of Patent: Aug. 24, 1993

[54] MOVABLE CONTROL-HANDLE FOR CHAINSAW

[76] Inventor: Daryl Maseck, 8273 Main St., Kinsman, Ohio 44428

[21] Appl. No.: 839,259

[22] Filed: Feb. 20, 1992

[51] Int. Cl.[5] ........................ B27B 17/02; B27B 17/00; B23D 57/02

[52] U.S. Cl. ........................................ 30/383; 30/381; 30/382

[58] Field of Search ................. 30/381, 382, 383, 386, 30/390; 200/81.8, 61.87, 332.2; 310/68 A, 68 B, 68 F, 47

[56] References Cited

U.S. PATENT DOCUMENTS

| | | | |
|---|---|---|---|
| 4,121,339 | 10/1978 | Nikolich | 30/381 |
| 4,594,780 | 6/1986 | Schliemann | 30/382 |
| 4,683,660 | 8/1987 | Schurr | 30/382 |
| 4,753,012 | 6/1988 | Schurr | 30/382 |
| 4,793,064 | 12/1988 | Nagashima | 30/382 |
| 5,094,000 | 3/1992 | Becht et al. | 30/382 |
| 5,150,523 | 9/1992 | McCurry | 30/382 |

FOREIGN PATENT DOCUMENTS

| | | | |
|---|---|---|---|
| 3430840 | 8/1985 | Fed. Rep. of Germany | 30/382 |

*Primary Examiner*—Frank T. Yost
*Assistant Examiner*—Paul M. Heyrana, Sr.
*Attorney, Agent, or Firm*—John P. Halvonik

[57] ABSTRACT

A safer and easier control of power to the chain by means of a hinged or flexible handle that is pressed or rotated in the direction of cut in order to drive the chain, and is released or rotated away from the direction of cut to stop the chain. This method of stopping the chain is of critical importance when a chainsaw is dropped by the supporting hand, because power to the chain is automatically stopped by the control-handle in the other hand, thereby much reducing the danger of injury or damage.

1 Claim, 1 Drawing Sheet

MOVABLE CONTROL-HANDLE FOR CHAINSAW

BACKGROUND

1. Field of Invention

This invention relates to the control of chainsaw motors and chainsaw chains, to enhance the safety and simplicity of their operation.

2. Description of Prior Art

Chainsaws are universally produced with a trigger that is pressed by the index finger to operate the motor and chain. If this type of chainsaw is dropped by the supporting hand, the saw's weight falls on the trigger finger of the control handle, thereby supplying power to the chain as the chainsaw falls, increasing the likelihood of severe injury or damage.

U.S. Pat. No. 4,121,339 of Oct. 24, 1978, "Safety Brake Mechanism for Chain Saws," by Milovan Nikolich describes a chain-braking system that is operated by the hand that supports the chainsaw, in which the brake is automatically in case of chainsaw kickback, so this chain-stopping mechanism is devised to solve the problem of injury from kickback, but does not address the problem of injury by a chainsaw that is dropped by the supporting hand, only to fall on the trigger finger of the control hand and supply power to the chain as the chainsaw falls.

U.S. Pat. No. 4,683,660 of Aug. 4, 1987, "Chain Saw Having a Braking Arrangement," by Volker Schurr describes a chain brake that is activated by the release of the throttle linkage or trigger, which does not address the problem of injury or damage by a chainsaw that is dropped by the supporting hand.

DRAWING FIGURES

Figure 1:
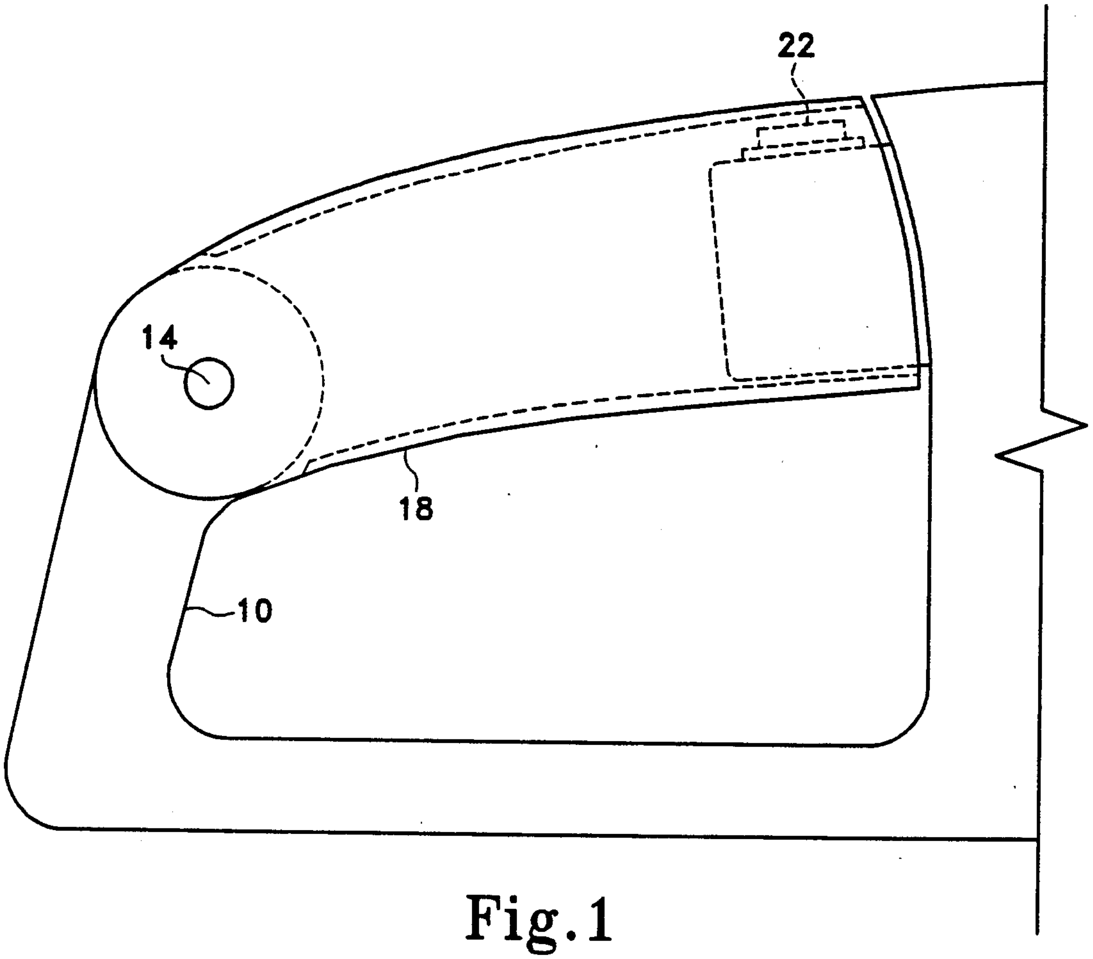

FIG. 1 Detail of control handle and control mechanism.

Figure 2:
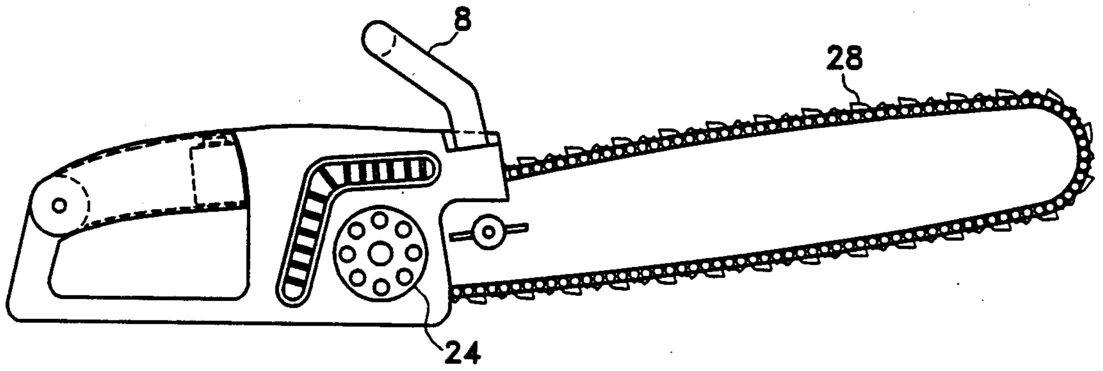

FIG. 2 Side view of chainsaw with control handle in place.

Reference Numerals in the Drawing

10 chainsaw handle

14 hinge

18 movable control-handle

22 motor control switch or linkage

DESCRIPTION

As shown in the illustration, the movable control-handle for a chainsaw is a handle that rotates in the direction of cut to start or increase the speed of the motor that drives the chain, but when the control-handle is lifted or rotated away from the cut, the control-handle either stops the motor or reduce its speed so as to stop the chain.

The control handle 18 may be hollow e.g. that shown so that a portion of the handle abuts the upper surface of the chain saw controlling means 22. Downward pressure must be kept on the handle in order to maintain pressure on the controlling means and keep the chain saw running. Lifting the handle upward will result in downward pressure being interrupted and hence power will be interrupted to the chain saw.

Operation

On an electric chainsaw, rotating or pressing the control-handle in the direction of cut closes an electric switch to provide current to the electric motor to drive the chain, but when the control-handle is rotated or lifted away from the cut, the switch is opened and the motor and chain stop.

On a gasoline-powered chainsaw, the motor control is a linkage from the control-handle to the motor to increase the motor speed as the control-handle is rotated or pressed in the direction of cut, but when released or rotated away from the cut, the linkage would slow the motor to a speed that would disengage the chain while permitting the motor to idle.

Summary, Ramifications and Scope

The basic concept is a movable control device for a chainsaw motor that can be rotated or pressed in the direction of cut to deliver power to a chainsaw chain, and rotated or lifted away from the cut to stop the delivery of power to the chain.

Any other motor-control or chain-control device, such as a thumb-button, palm-operated lever, pressure-plate, rocker switch or flexible handle, any of which would require rotation or pressure in the direction of cut, or would require release or rotation away from the cut to stop the chain, would simply be a variation of the control-handle presented here. Furthermore, the shape and configuration of the chainsaw handle is not limited to the chainsaw handle shown in the drawing.

I claim:

1. A chain saw motor controlling apparatus for use in connection with the handles of chain saws having motors where said handles have an upper side and an under side, said apparatus comprising: a control means for controlling operation of said chain saw motor so long as downward pressure is exerted on said control means, said control means located on said upper side of said handle and having an upper surface, a control handle pivotally connected to said upper side of said handle so as to abut said upper surface so that downward pressure on said control handle will operate said motor.

* * * * *